United States Patent [19]
Reiter

[11] 3,810,604
[45] May 14, 1974

[54] TANK AGITATING AND CLEANING SYSTEM

[75] Inventor: Jerome A. Reiter, Lancaster, Tex.

[73] Assignee: Reiter Industries, Inc., Dallas, Tex.

[22] Filed: Apr. 16, 1971

[21] Appl. No.: 134,698

[52] U.S. Cl.................................. 259/18, 134/34
[51] Int. Cl............................................. B01f 5/04
[58] Field of Search ................ 259/18, 4, 151, 147; 239/142, 143, 568; 134/22, 34

[56] References Cited
UNITED STATES PATENTS

| | | | |
|---|---|---|---|
| 2,322,087 | 6/1943 | Atwood | 259/18 |
| 2,580,215 | 12/1951 | Bozich | 214/44 |
| 2,583,725 | 1/1952 | Brown | 231/124 |
| 3,266,870 | 8/1966 | Clanflone | 239/568 |
| 3,586,294 | 6/1971 | Strong | 259/18 |

*Primary Examiner*—Robert W. Jenkins
*Attorney, Agent, or Firm*—Richards, Harris & Hubbard

[57] ABSTRACT

The specification describes a food product tank agitation and cleaning system comprising an elongated pipe which is extended along the length of a food product tank. A plurality of grooves are spaced along the pipe to form spray nozzles. A vertically extending conduit extends through an opening in the upper portion of the tank and connects to the pipe. A plurality of spaced apart clamps are connected to the bottom of the tank and include hooks for removably clamping the pipe a predetermined distance above the bottom of the tank. When it is desired to agitate the food product in the tank, pressurized air is applied through the conduit and is directed from the grooves in the pipe to bubble up through the food product. When it is desired to clean the interior of the tank, pressurized fluid is forced through the conduit and is sprayed from the pipe to clean the interior of the tank. The pipe is constructed and is supported in such a way that food products do not accumulate in the area of the pipe.

9 Claims, 4 Drawing Figures

PATENTED MAY 14 1974 3,810,604

INVENTOR:
JEROME A. REITER

Richards, Harris & Hubbard
ATTORNEYS

INVENTOR:
JEROME A. REITER

TANK AGITATING AND CLEANING SYSTEM

FIELD OF THE INVENTION

This invention relates to tank agitating and cleaning systems, and more particularly relates to a system and method for providing agitation of food products within a tank and for additionally providing thorough washing and cleaning of the interior of the tank after the food product has been dispensed therefrom.

THE PRIOR ART

A number of commodities are presently transported in tanks which are hauled by trucks, railway tank cars and the like. In particular, large quantities of products such as milk, soft drinks, chemicals and other food products are conventionally hauled in tank trucks such as overroad tankers or bulk pick-up tanker trucks.

In the case of raw milk, large stainless steel tank trucks are utilized to transport raw milk from country receiving stations to city processing plants. During such transportation, the cream content of the raw milk tends to rise toward the surface, so that the upper portions of the milk in the tank will have a much higher butterfat content than the lower portions of the milk. It has thus been heretofore known to introduce air bubbles through the raw milk inside the tank in order to agitate and more evenly mix the butterfat content of the milk. An example of such an air agitating system is disclosed in the Brown et al. U.S. Pat. No. 2,583,725, issued Jan. 29, 1952.

However, such previously developed milk agitating systems have been subject to build-up and accumulation of milk products during operation, thereby presenting sanitation problems after the milk is dispensed from the tank. Such previously developed systems have also been difficult to clean and thus have not been widely accepted by the industry or certified by government health regulatory agencies. In addition, previously developed air agitation systems which have utilized rigidly mounted pipes for dispensing of air into the raw milk have been subject to pipe breakage, due to twisting of the tank truck in normal operation.

After the product within the tank truck has been dispensed from the tank, it becomes extremely important to thoroughly clean the interior of the tank before reloading of the tank with additional products. In the case of food products, such thorough cleansing is even more mandatory. Systems have thus been previously developed for inserting fluid spray nozzles through the top of a tank and spraying pressurized fluid on the interior of the tank to effect cleaning thereof. An example of such a tank cleaning system is disclosed in U.S. Pat. No. 3,033,215, issued to E. R. Miller on May 8, 1962.

However, due to the localized nature of the sprayheads utilized, such previously completely clean. In addition, the cleaning systems have not been completely satisfactory in effectively cleaning the relatively large tanks utilized in modern transportation. In some systems, rigid pipes have been welded or otherwise rigidly attached to the bottom of such tanks and have been provided with nozzles for cleaning the entire length of the tank interior. However, such rigidly mounted pipes have been looked upon with disfavor by government regulatory agencies, due to the tendency of such systems to accumulate food products, thereby leading to health and sanitation problems. Due to the rigid mounting of such pipes, such systems are difficult, if not impossible to completely clean. In addition, the rigid mounting of such pipes has resulted in broken pipes due to twisting of a tank truck during normal operation.

SUMMARY OF THE INVENTION

In accordance with the present invention, a system is provided which may provide both agitation of a fluid product within a tank and additionally may provide cleaning of the interior of the tank after the product has been dispensed therefrom. The present system is designed to prevent product build-up, and therefore eliminates many sanitation and health problems which have heretofore arisen in previous systems. The present system provides excellent and uniform agitation as well as cleaning, and may be easily removed for thorough cleaning when desired.

In accordance with one aspect of the invention, a fluid tank aeration and agitation system includes an elongated array of spray nozzles which may be disposed along the length of the interior of a fluid tank. Clamp structure rigidly supports the spray nozzle array a predetermined distance from the bottom of the tank. A conduit directs gas through the spray nozzles in order to agitate the fluid within the tank.

In accordance with another aspect of the invention, a tank cleaning system is provided which includes an elongated array of spray nozzles which may be disposed along the length of a tank. Structure rigidly supports the array a predetermined distance from the bottom of the tank. A conduit means is provided to direct pressurized fluid through the spray nozzles for cleaning the interior of the tank.

In accordance with another aspect of the invention, a food product tank aeration and cleaning system includes an elongated pipe for being disposed along the length of a tank. A plurality of apertures are spaced along the pipe. A vertically extending conduit is connected to the pipe and extends through an opening in the upper portion of the tank. A plurality of supports are rigidly connected along the bottom of the tank and include clamps for removably clamping the pipe a predetermined distance above the bottom of the tank.

In accordance with yet another aspect of the invention, a method of aerating and cleaning a fluid tank includes the steps of directing gas downwardly from an opening in the tank to a pipe disposed above and along the bottom region of the tank. The gas is then released from spaced apart apertures along the pipe to allow the gas to bubble up through the fluid in the tank. After the fluid is dispensed from the tank, pressurized fluid is then directed downwardly from an opening in the tank to the pipe for spraying the liquid against the interior of the tank.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENT

Figure 1:
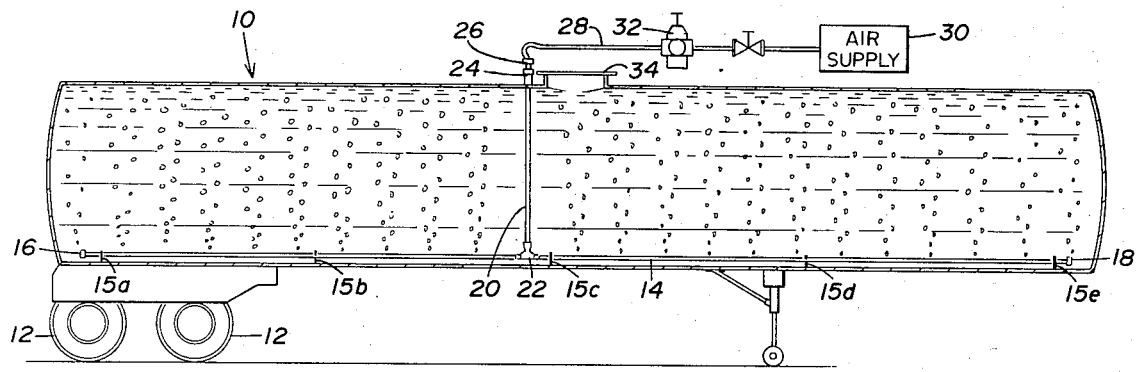
FIG. 1 is a sectional view of a typical milk truck tank illustrating the operation of the aeration and agitation system of the invention.

Referring to FIG. 1, a typical overroad or bulk pick-up tanker trailer includes a tank designated generally by the numeral 10. Such a truck trailer is adapted to be hauled in a conventional manner by any suitable tractor truck and is supported adjacent the rear end by truck tires 12.

Figure 2:
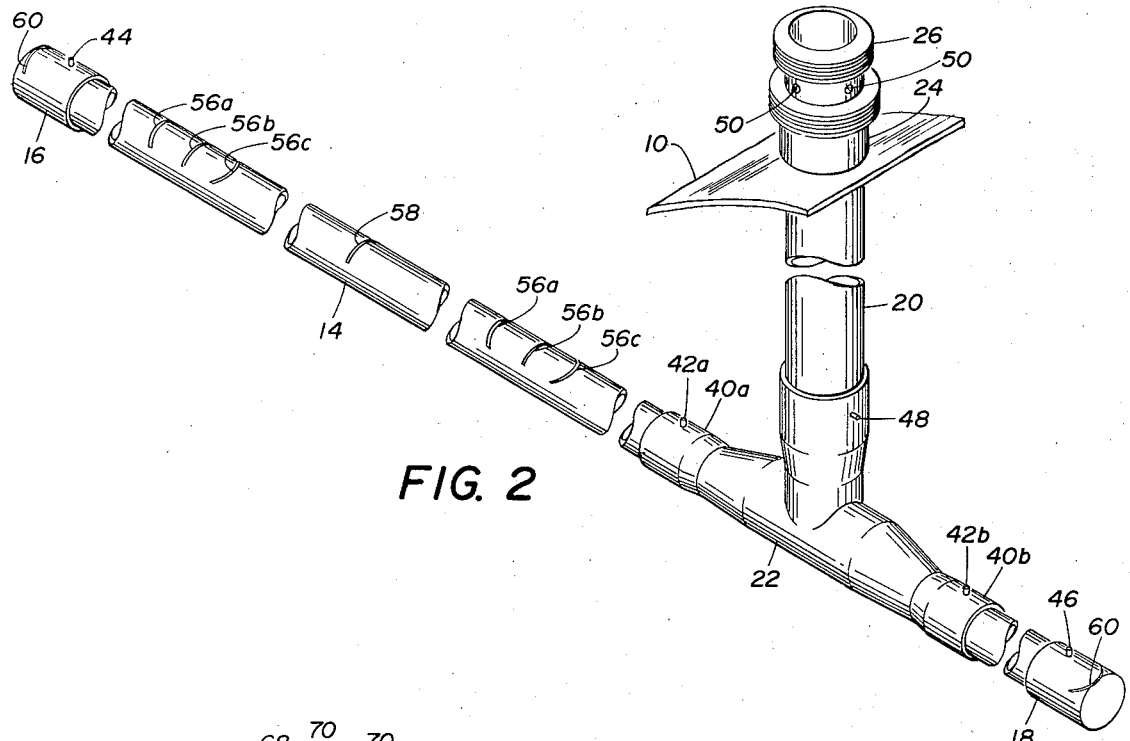
FIG. 2 is a perspective view, partially broken away, of the vertical conduit and pipe array of the invention.

In the embodiment illustrated in FIG. 1, the tank 10 is filled with raw milk, although it will be understood that the tank may contain other commodites such as liquid food products, chemicals and the like. The invention comprises an elongated pipe 14 which includes a plurality of spray nozzles disposed along the length thereof. The pipe 14 is rigidly supported a predetermined distance from the bottom of the tank 10 by a plurality of clamp supports 15a–e. The ends of the pipe 14 are capped by caps 16 and 18. As will be later described, the caps 16 and 18 are connected in a pinned swedge joint in order to allow drainage therefrom. A vertically extending conduit 20 is connected by a T-connection 22 to the center region of the pipe 14. As shown in FIGS. 1 and 2, conduit 20 extends upwardly through the tank 10 and through a sleeve 24 which is rigidly connected to tank 10. Conduit 20 terminates in threads 26.

When the agitating and aerating system of the invention is being utilized, a flexible air line 28 (FIG. 1) is connected to threads 26 by a suitable threaded connector. A supply of pressurized air 30 applies air or another suitable gas through an air filter and regulator 32. The agitating gas is supplied through the conduit 20 to the pipe 14, and is then emitted from the spray nozzles disposed along the pipe 14. The gas then bubbles upwardly through the milk or other product to agitate the product. The conduit 20 is disposed to one side of the upper entrance 34 to the tank 10 in order that the present system does not obstruct normal access to the tank 10.

FIG. 2 illustrates in greater detail the construction of the pipe 14. An important aspect of the invention is that the pipe 14 comprises at least two sections, each of which is pinned at swedge joints 40a–b by pins 42a–b to the T-connection 22. As is also illustrated in FIG. 2, the caps 16 and 18 are pinned in a swedge joint by pins 44 and 46 to the ends of the pipe 14. In addition, the lower part of the conduit 20 is connected by a pin 48 at a swedge joint to the T-connection 22. The sleeve 24 is rigidly connected as by welding to the top of the tank 10. The conduit 20 extends through the sleeve 24 and terminates in threads 26. When the system is not in use, the threads 26 are capped by suitable threaded cap.

Holes 50 are drilled through the conduit 20 just below threads 26 in order to enable the system to be flushed with water for cleaning purposes. Although it will be understood that various sizes and types of pipes may be utilized for various embodiments of the invention, in one embodiment of the invention which worked well, the pipe 14 comprised 1½-inch outer diameter tubing, while the conduit 20 comprises a 2-inch outer diameter tubing. The sleeve 24 was provided with a 2½-inch outer diameter and was sized to receive the 2-inch outer diameter conduit 20. The swedge and pinned joints of the system shown in FIG. 2 are important, in that fluid is allowed to drain through the pinned joints during the cleaning operation in order to make the tubing system self-cleaning.

Again referring to FIG. 2, it may be seen that the spray apertures of the invention are provided by the grooves formed in the upper region of the pipe 14. In the preferred embodiment, a group of three grooves 56a–c are defined in pipe 14 at 30-inch intervals. Each of the grooves 56a and 56c are angled at approximately 45° to the vertical, with the grooves 56b being essentially vertically disposed. Spaced between each set of grooves 56a–c is a single vertical jet groove 58. While different orientations and types of spray nozzle arrays may be used with the invention, the illustrated groove apertures have been found inexpensive to fabricate and maintain, while providing excellent agitating and spray cleaning functions. Each of the caps 16 and 18 include an angled jet 60 defined therein in order to provide spray cleaning of the ends of the tanker.

Figure 3:
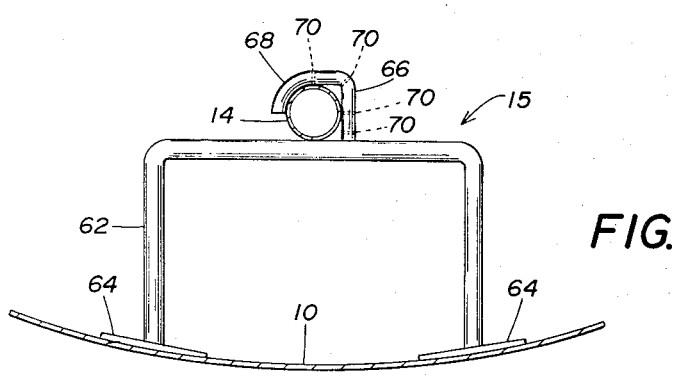
FIG. 3 is a side view of one of the pipe support clamps of the invention.

FIG. 3 illustrates a side view of one of the clamp supports 15. The clamp support includes a generally U-shaped support 62, the ends thereof being connected to rectangular metal feet 64 which are welded to the bottom of the tank 10. On the upper portion of the U-shaped support 62 is welded a hook member 66. In installation of the pipe 14, the pipe is inserted into the open mouth of the hook 66 and the end portion 68 of the hook is bent downwardly in order to securely maintain the pipe 14 in the desired position above the bottom of the tank 10. The hook member 66, however, does allow the pipe 14 to twist slightly during normal operation of the truck in order to prevent breakage of the pipe. In an embodiment of the invention which worked well, the pipe 14 was located approximately 6 inches from the floor of the tank 10. Apertures 70 are drilled through the hook 66 in order to enable the pipe 14 and the hook member 66 to be thoroughly cleaned to prevent accumulation of food products therebetween. If it is desired to remove the pipe 14 for cleaning or replacement, the end 68 of the hook 66 may be moved upwardly to enable removal of the pipe 14.

Figure 4:
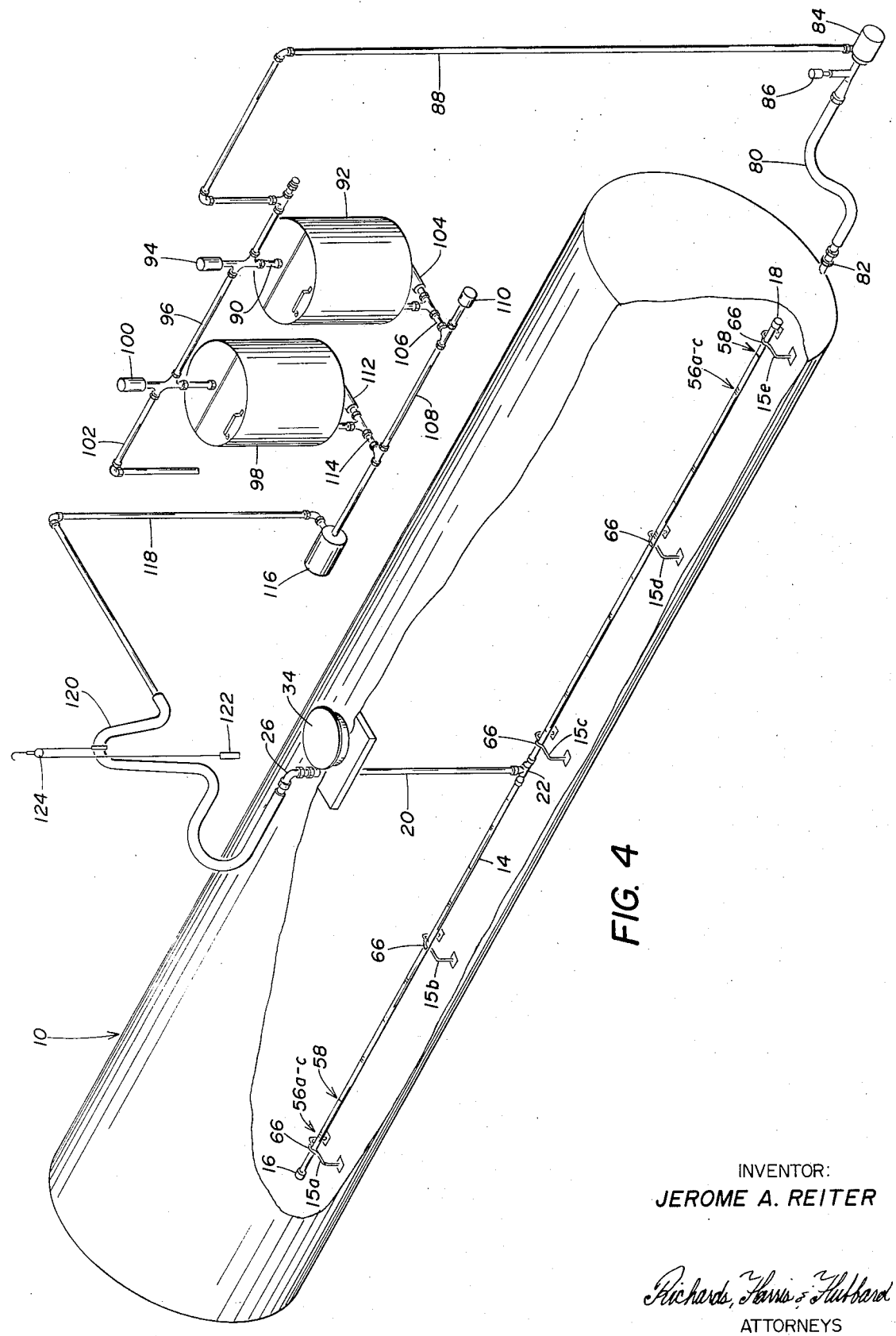
FIG. 4 is a perspective view, partially broken away, of the present invention when used to clean the interior of a truck tank.

An important aspect of the invention is that adjacent ones of the clamp supports 15a–e are mounted such that the mouths of the hook members 66 face opposite directions. This provides additional structural security to the system. This alternate facing of the hook members 66 is shown in FIG. 4, wherein the system is illustrated as being connected to a wash system. Like numbers are utilized throughout the drawings for like and corresponding parts previously described.

After the milk or other commodity has been pumped from the tank 10, and it is desired to wash the interior of the tank, a return hose 80 is connected by a threaded connection to the outlet aperture 82 formed in the tank 10. The other end of the hose 80 is connected to a return pump 84 which includes an air eliminator 86. A pipe 88 leads from the pump 84 and feeds through a pipe 90 to a wash tank 92. An air operated valve 94 is controlled by suitable electrical circuitry, not shown, in order to vary the fluid passing to and from the wash tank, in a manner to subsequently be described. A pipe 96 connects the wash tank 92 with a rinse tank 98. An air control valve 100, also operated by electrical circuitry, not shown, controls the passage of fluids into a drain pipe 102.

The output of the wash tank 92 is controlled by an air operated valve 104 connected to a pipe 106 which feeds into a pipe 108. An air flow check valve 110 is connected to the end of pipe 108. The output of the rinse tank 98 is controlled by an air operated valve 112 and is connected through a pipe 114 to pipe 108. A supply pump 116 forces fluid from tanks 92 and 98 through a pipe 118 and a flexible hose 120. Flexible hose 120 is provided with tension by means of a counterweight 122 connected to the hose 120 via a pulley 124. The end of the hose 120 is connected by a suitable fitting to the threads 26 of the conduit 20.

In operation of the wash system as shown in FIG. 4, after the milk or other commodity is dispensed from the tank 10, the hose 80 is connected to the outlet aperture 82 and the flexible hose 120 is connected to the threads 26. The supply pump 116 is turned on for a period of approximately 10 seconds to force pressurized cleaning liquid such as water or the like through the conduit 20 and out the grooves 56a–c and 58 in order to rinse the milk foam from the upper portions of the tank. The return pump 84 is then turned on to suck out the foam which has drained to the bottom of the tank 10. The foam is then pumped via pipes 88, 96 and out the drain pipe 102. Pump 116 is then turned on and off for a number of successive bursts while the pump 84 continues pumping water out the drain pipe 102.

Air control valves 94 and 104 are then opened and wash solution, such as a chemical soap solution or the like, is circulated through the pipes 108, 118 and hose 120. The wash solution is then sprayed from the pipe 14 for a substantial period of time, such as about 20 minutes. Valve 104 is then turned off and valve 112 is opened to allow rinse water to be pumped into the pipe 14 and sprayed upon the interior of the tank. This pre-rinse is pumped for about 10 seconds, whereupon pump 84 pumps the soap solution back into the wash tank 92. Valve 94 then closes and valve 100 opens and pump 116 is turned on for approximately a 10-second interval. The system is then allowed to circulate the fluid then in the pipe for about three minutes in order to collect the residue cleaning liquid in the rinse tank 98. Pump 116 then shuts off and pump 84 runs for an additional period such as about 15 seconds and then shuts off. At this time, the interior of the tank is adequately cleaned and the hoses 80 and 120 may be disconnected and the tank 10 reused for additional transportation of raw milk or other commodities.

It will thus be seen that the present invention provides an extremely useful system for providing both agitation and cleaning functions to a bulk fluid tank. The system may be easily installed, and yet is sufficiently rigid to withstand shocks and twisting motions during normal road usage. The system is particularly designed to prevent product build-up about the spray system and has been found practical for use in raw milk bulk tank trucks. If desired, the system may be completely removed from the tank and cleaned and then replaced.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A tank cleaning system comprising:
    an elongated array of spray nozzles for being disposed along the length of said tank,
    a plurality of clamps mounted along the bottom of said tank for rigidly supporting said array a predetermined distance from the bottom of said tank,
    said clamps each including a generally U-shaped support member rigidly connected at the ends thereof to the bottom of said tank and hook means connected to the upper part of said U-shaped member for receiving said array, successive ones of said hook means being positioned to open in opposite directions, and
    conduit means for directing pressurized fluid through said spray nozzles for cleaning the interior of said tank.

2. A tank cleaning system comprising:
    an elongated array of spray nozzles for being disposed along the length of said tank,
    a plurality of clamps mounted along the bottom of said tank for rigidly supporting said array a predetermined distance from the bottom of said tank,
    said clamps each including a generally U-shaped support member rigidly connected at the ends thereof to the bottom of said tank and hook means connected to the upper part of said U-shaped member for receiving said array, said hook means including a plurality of apertures therein to enable cleaning of said clamps, and
    conduit means for directing pressurized fluid through said spray nozzles for cleaning the interior of said tank.

3. A food product tank aeration and cleaning system comprising:
    an elongated pipe for being disposed along the length of said tank,
    a plurality of fluid spray means located on said pipe,
    vertically extending conduit means connected to said pipe and extending through an opening in the upper portion of said tank, and
    a plurality of supports rigidly connected along the bottom of said tank and including clamps for removably clamping said pipe a predetermined distance above the bottom of said tank, said clamps including generally U-shaped support members rigidly connected at the ends thereof to the bottom of said tank and hook means connected to the upper portion of said support members for securely receiving said pipe.

4. The system of claim 3 and further comprising:
    apertures formed through said hook means for enabling cleaning of said hook means when said pipe is disposed therein.

5. The system of claim 3 wherein successive supports are positioned such that the respective hook means are directed in opposing directions.

6. A food product tank aeration and cleaning system comprising:
    an elongated pipe for being disposed along the length of said tank,
    a plurality of fluid spray means located on said pipe, said pipe comprising a plurality of sections joined to allow fluid drainage therefrom, caps being loosely fitted over the ends of said pipe to allow fluid to drainage therefrom, a plurality of fluid spray means located on said pipe, vertically extending conduit means connected to said pipe and extending through an opening in the upper portion of said tank, and a plurality of supports rigidly connected along the bottom of said tank and including clamps for removably clamping said pipe a predetermined distance above the bottom of said tank.

7. A food product tank aeration and cleaning system comprising:

an elongated pipe dimensioned for being disposed along the length of said tank, a plurality of support pedestals rigidly mounted to the bottom of said tank for supporting said pipe a distance above the bottom of said tank, fluid spray means located on said pipe, draining means in said pipe for allowing excess fluid to drain therefrom, a T-connection member connected in the central region of said pipe, a vertical pipe section connected to said T-connection member and extending upwardly through an opening in said tank, and connection means on the top of said vertical pipe section for selective connection to sources of pressurized gas and fluid.

8. A food product tank aeration and cleaning system comprising:

an elongated pipe dimensioned for being disposed along the length of said tank, a plurality of support pedestals rigidly mounted to the interior bottom of said tank for supporting said pipe a distance above the interior bottom of said tank, said support pedestals including means for removably attaching the upper portion of said pedestals to said pipe, fluid spray means located on said pipe, a T-connection member connected in the central region of said pipe, a vertical pipe section connected to said T-connection member and extending upwardly through an opening in said tank, and connection means on the top of said vertical pipe section for selective connection to forces of pressurized gas and fluid.

9. The system of claim 8 and further comprising:

a feed through sleeve rigidly connected to the top of said tank, said vertical pipe section extending through said sleeve, and apertures formed in said sleeve to enable cleaning thereof.

* * * * *

PO-1050
(5/69)

UNITED STATES PATENT OFFICE
CERTIFICATE OF CORRECTION

Patent No. 3,810,604      Dated May 14, 1974

Inventor(s) Jerome A. Reiter

It is certified that error appears in the above-identified patent and that said Letters Patent are hereby corrected as shown below:

Col. 1, lines 56-59, immediately following "such previously" delete "completely clean. In addition, the cleaning systems have not been completely satisfactory in effectively cleaning the relatively large tanks utilized in modern transportation." and insert --developed cleaning systems have not been completely satisfactory in effectively cleaning the relatively large tanks utilized in modern transportation.--.

Signed and sealed this 24th day of September 1974.

(SEAL)
Attest:

McCOY M. GIBSON JR.
Attesting Officer

C. MARSHALL DANN
Commissioner of Patents